(12) United States Patent
Turaga et al.

(10) Patent No.: US 7,042,946 B2
(45) Date of Patent: May 9, 2006

(54) WAVELET BASED CODING USING MOTION COMPENSATED FILTERING BASED ON BOTH SINGLE AND MULTIPLE REFERENCE FRAMES

(75) Inventors: Deepak S. Turaga, Croton on Hudson, NY (US); Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 666 days.

(21) Appl. No.: 10/218,213

(22) Filed: Aug. 13, 2002

(65) Prior Publication Data

US 2003/0202597 A1 Oct. 30, 2003

Related U.S. Application Data

(60) Provisional application No. 60/376,381, filed on Apr. 29, 2002, provisional application No. 60/395,921, filed on Jul. 15, 2002.

(51) Int. Cl.
*H04N 7/12* (2006.01)
(52) U.S. Cl. .................. 375/240.19; 382/240
(58) Field of Classification Search ........... 375/240.11, 375/240.19, 240.16, 240.29, 240.21; 382/240, 382/238, 281
See application file for complete search history.

(56) References Cited

U.S. PATENT DOCUMENTS

| | | | |
|---|---|---|---|
| 5,301,020 A | 4/1994 | Casseraeu | 368/415 |
| 5,764,805 A * | 6/1998 | Martucci et al. | 382/238 |
| 6,084,912 A | 7/2000 | Reitmeier et al. | 375/240 |
| 6,212,235 B1 | 4/2001 | Nieweglowski et al. | 375/240.08 |
| 6,373,894 B1 * | 4/2002 | Florencio et al. | 375/240.19 |
| 6,381,276 B1 * | 4/2002 | Pesquet-Popescu | 375/240.11 |
| 6,674,911 B1 * | 1/2004 | Pearlman et al. | 382/240 |
| 6,718,055 B1 * | 4/2004 | Suri | 382/128 |

OTHER PUBLICATIONS

Gary J. Sullivan et al; "Using the Draft H-26L Video Coding Standard for Mobile Applications".
Scung-Jong Choi et al; "Motion-Compensated 3-D Subband Coding of Video", IEEE Transactions on Image Processing, vol. 8, No. 2 Feb. 1999.
Jens-Rainer; "Three-Dimensional Subband Coding with Motion Compensation", IEEE Transactions on Image Processing, vol. 3, No. 5, Sep. 1994.
"Unconstrained motion compensated temporal filtering", by Turaga et al, Proposal for the MPEG-4 AHG on Interframe Wavelet Coding, XP-002260700.

(Continued)

*Primary Examiner*—Gims Philippe
(74) *Attorney, Agent, or Firm*—Russell Gross

(57) ABSTRACT

A method and device is disclosed for encoding a group of video frames. A first number of frames in the group is motion compensated temporally filtered based on multiple frames.

A second number of frames in the group is motion compensated temporally filtered based on single reference frames. The first and second number of frames are transformed into wavelet coefficients. Further, the wavelet coefficients are entropy encoded. In one example, the first number of frames are located within a first portion of the group and the second number of frames is located within a second portion of the group. In another example, the first number of frames and the second number of frames are interleaved within the group.

10 Claims, 3 Drawing Sheets

OTHER PUBLICATIONS

"Temporal Domain Sub-Bank Video Coding with Motion Compensatin", by Ohm, IEEE 1992, XP000378915.

"Motion-Compensated 3-D Subband Coding of Video", by Choi et al, IEEE 1999, XP000831916.

"A Fully Scalable 3D Subband Video Coded", by Bottreau et al, IEEE 2001, XP-010563939.

"Long-Term Memory Motion-Compensated Prediction", by Wiegand et al, IEEE 1999, XP000802288.

* cited by examiner

WAVELET BASED CODING USING MOTION COMPENSATED FILTERING BASED ON BOTH SINGLE AND MULTIPLE REFERENCE FRAMES

CROSS REFERENCE TO RELATED APPLICATIONS

The present application claims the benefit of U.S. Provisional Application Ser. No. 60/376,381, filed on Apr. 29, 2002, and of U.S. Provisional Application Ser. No. 60/395,921, filed on Jul. 15, 2002, the teachings of which are incorporated herein by reference.

The present application is related to U.S. application Ser. No. 10/218,214, entitled "Motion Compensated Temporal Filtering Based On Multiple Reference Frames For Wavelet Based Coding" and U.S. application Ser. No. 10/218,221, entitled "Scalable Wavelet Based Coding Using Motion Compensation Temporal Filtering Based on Multiple Reference Frames", being filed concurrently herewith.

BACKGROUND OF THE INVENTION

The present invention relates generally to video compression, and more particularly, to wavelet based coding utilizing motion compensated temporal filtering based on both single reference frames and multiple reference frames.

A number of the current video coding algorithms are based on motion compensated predictive coding, which are considered hybrid schemes. In such hybrid schemes, temporal redundancy is reduced using motion compensation, while spatial redundancy is reduced by transform coding the residue of motion compensation. Commonly used transforms include the discrete cosine transform (DCT) or sub-band/wavelet decompositions. Such schemes, however, lack flexibility in terms of providing true scalable bit streams.

Another type of scheme known as 3D sub-band/wavelet (hereafter "3D wavelet") based coding has gained popularity especially in the current scenario of video transmission over heterogeneous networks. These schemes are desirable in such application since very flexible scalable bit streams and higher error resilience is provided. In 3D wavelet coding, the whole frame is transformed at a time instead of block by block as in DCT based coding.

One component of 3D wavelet schemes is motion compensated temporal filtering (MCTF), which is performed to reduce temporal redundancy. An example of MCTF is described in an article entitled "Motion-Compensated 3-D Subband Coding of Video", IEEE Transactions On Image Processing, Volume 8, No. 2, February 1999, by Seung-Jong Cboi and John Woods, hereafter referred to as "Woods".

In Woods, frames are filtered temporally in the direction of motion before the spatial decomposition is performed. During the temporal filtering, some pixels are either not referenced or are referenced multiple times due to the nature of the motion in the scene and the covering/uncovering of objects. Such pixels are known as unconnected pixels and require special handling, which leads to reduced coding efficiency. An example of unconnected and connected pixels is shown in FIG. 1, which was taken from Woods.

SUMMARY OF THE INVENTION

The present invention is directed to a method and device for encoding a group of video frames. According to the present invention a first number of frames in the group is motion compensated temporally filtered based on multiple frames. A second number of frames in the group is motion compensated temporally filtered based on single reference frames. The first and second number of frames are transformed into wavelet coefficients. Further, the wavelet coefficients are entropy encoded. In one example, the first number of frames are located within a first portion of the group and the second number of frames is located within a second portion of the group. In another example, the first number of frames and the second number of frames are interleaved within the group.

The present invention is also directed to a method and device for decoding a bit-stream including a group of encoded video frames. According to the present invention, the bit-stream is entropy decoded to produce wavelet coefficients. The wavelet coefficients are transformed into a group of partially decoded frames. A first number of partially decoded frames is inverse temporally filtered using multiple reference frames. A second number of partially decoded frames is inverse temporally filtered using single reference frames. In one example, the first number of partially decoded frames are located within a first portion of the group and the second number of frames is located within a second portion of the group. In another example, the first number of partially decoded frames and the second number of partially decoded frames are interleaved within the group.

BRIEF DESCRIPTION OF THE DRAWINGS

Referring now to the drawings were like reference numbers represent corresponding parts throughout.

DETAILED DESCRIPTION

As previously described, one component of 3D wavelet schemes is motion compensated temporal filtering (MCTF), which is performed to reduce temporal redundancy. During the MCTF, unconnected pixels may result that require special handling, which may lead to reduced coding efficiency. The present invention is a directed towards a MCTF scheme that uses both single reference frames and multiple reference frames during motion estimation and temporal filtering. The use of multiple reference frames is desirable in order to improve coding efficiency by improving the quality of the match and also to reduce the number of unconnected pixels. Further, the use of single and multiple reference frames may be adaptively chosen based on the desired coding efficiency.

Figure 2:
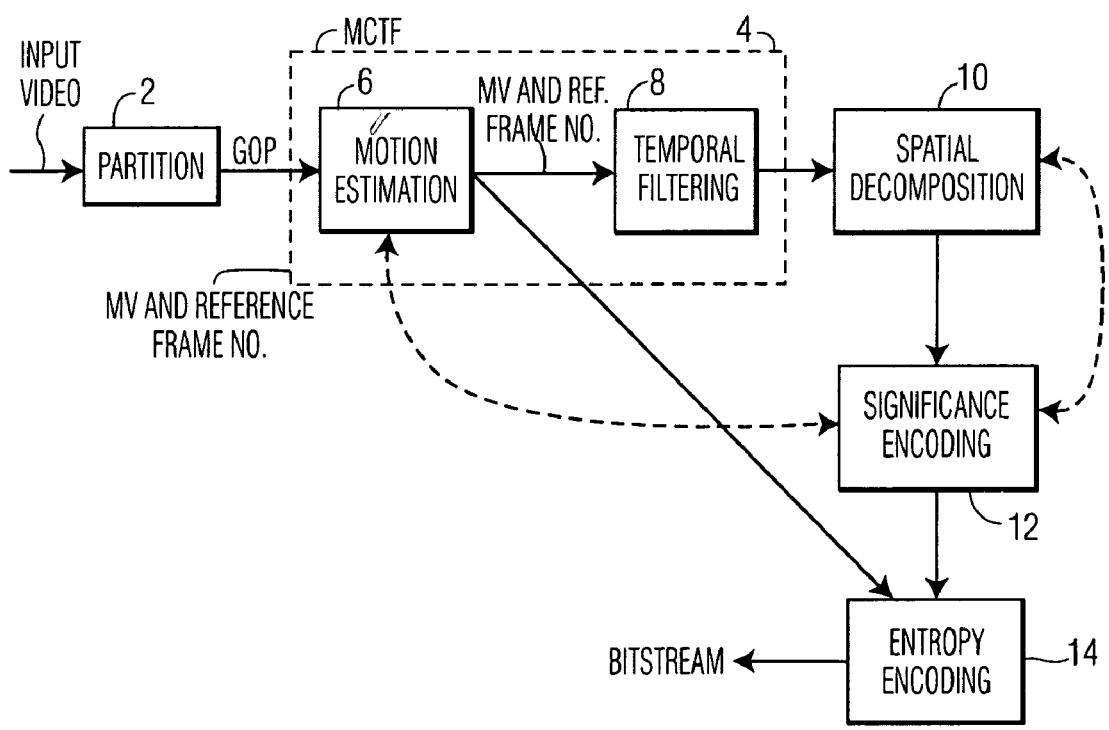
FIG. 2 is a block diagram of one example of an encoder according to the present invention.

One example of encoder according to the present invention is shown in FIG. 2. As can be seen, the encoder includes a partitioning unit 2 for dividing the input video into a group of pictures (GOP), which are encoded as a unit. According to the present invention, the partition unit 2 operates so that the GOP includes a predetermined number of frames or are determined dynamically during operation based on parameters such as bandwidth, coding efficiency, and the video content. For instance, if the video consists of rapid scene changes and high motion, it is more efficient to have a shorter GOP, while if the video consists of mostly stationary objects, it is more efficient to have a longer GOP.

As can be seen, a MCTF unit 4 is included that is made up of a motion estimation unit 6 and a temporal filtering unit 8. As previously described, the present invention is directed to MCTF that uses both single reference frames and multiple reference frames. Thus, during operation, the motion estimation unit 6 will match regions of a particular frame to either regions in one other frame or multiple frames in the same GOP. The use of single or multiple reference frames may be performed in a predetermined manner or may be adaptively chosen based on the desired coding efficiency.

In regard to the motion compensation based on multiple reference frames, the frames that are processed by the motion estimation unit 6 will be defined as H-frames. Further, a number of frames in a GOP will not processed by the motion estimation unit 6, which are defined as A-frames. The number of A-Frames in each GOP may vary due to a number of factors. First of all, either the first or last frame in each GOP may be an A-frame depending on whether, forward, backward or bi-directional prediction is used. Further, a number of frames in each GOP may be selected as an A-frame in order to provide temporal scalability. This selection may be made at any arbitrary interval such as every second frame, third frame, fourth frame, . . . etc.

The use of A-frames enables the video encoded according to the present invention to be temporally scalable. Since the A-frames are independently encoded, video is able to be decoded at a lower frame rate with good quality. Further, based on which frames are not selected to be processed by the motion estimation unit 6, the A-frames may be inserted in a GOP at any arbitrary interval, which will enable video to be decoded at any arbitrary frame rate such as one-half, one-third, one-fourth, . . . etc. Further, the use of A-frames limits prediction drift since these frames are coded without reference to any other frames.

In one example, the motion estimation unit 6 will perform backward prediction based on multiple reference frames. Thus, groups of pixels or regions in one or more frames of the GOP are matched to similar groups of pixels or regions in previous frames of the same GOP. In this example, the previous frames in the GOP are the reference frames for each frame processed. Since backward prediction is used in this example, the first frame in a GOP may be an A-frame since there are no previous frames available. However, alternatively, the first frame may be forward predicted in another example.

In another example, the motion estimation unit 6 will perform forward prediction based on multiple reference frames. Thus, groups of pixels or regions in one or more frames of the GOP are matched to similar groups of pixels or regions in proceeding frames of the same GOP. In this example, the proceeding frames in the GOP are the reference frames for each frame processed. Since forward prediction is used in this example, the last frame in a GOP may be an A-frame since there are no proceeding frames available. However, alternatively, the last frame may be backward predicted in another example.

In another example, the motion estimation unit 6 will perform bi-directional prediction based on multiple reference frames. Thus, groups of pixels or regions in one or more frames of the GOP are matched to similar groups of pixels or regions in both previous and proceeding frames of the same GOP. In this example, the previous and proceeding frames in the GOP are the reference frames for each frame processed. Since bi-directional prediction is used in this example, the first or last frame in a GOP may be an A-frame since there are no previous or proceeding frames available. However, alternatively, the first frame may be forward predicted or the last frame may be backward predicted in another example.

As a result of the above described matching, the motion estimation unit 6 will provide a motion vector MV and a frame number for each region matched in the current frame being processed. If a single reference frame is used, regions in a particular frame should have the same associated frame number. If multiple reference frames are used, then regions in a particular frame may have different associated frame numbers. Further, in some cases, there will be only one motion vector MV and frame number associated with each region in the current frame being processed. However, if bi-directional prediction is used, there may be two motion vectors MV and frame numbers associated with each region. Each motion vector and frame number will indicate the position and the other frame in the GOP that includes the similar region matched to the region in each frame being processed.

During operation, the temporal filtering unit 8 removes temporal redundancies between the frames of each GOP according to the motion vectors MV and frame numbers provided by the motion estimation unit 6. In order to perform this, the temporal filtering unit 8 retrieves the similar regions that were previously matched to the regions in each frame being processed. This will be done according to the motion vectors and frame reference numbers provided by the motion estimation unit 6. Further, the temporal filtering unit 8 will then apply a different method to a particular frame depending on whether the motion compensation performed on a particular frame was based on single reference frames or multiple reference frames.

Figure 1:
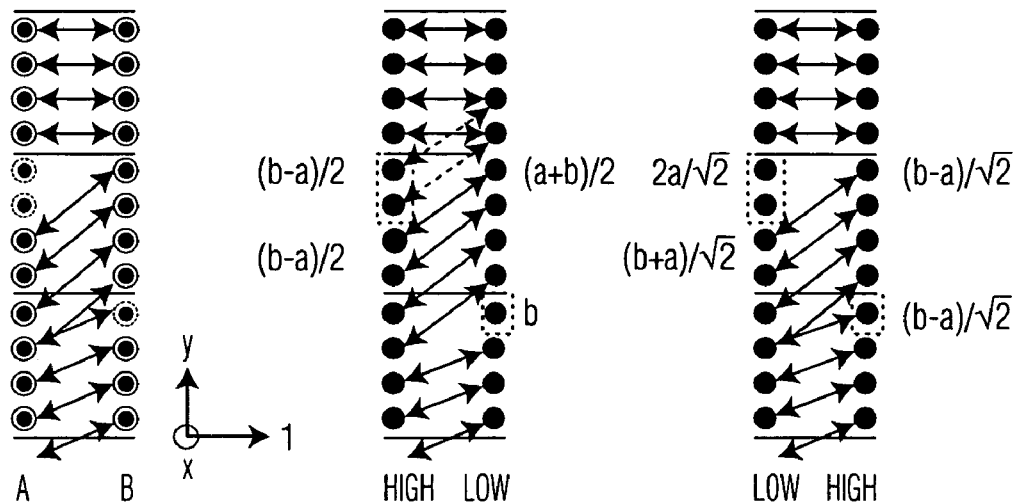
FIG. 1 is a diagram illustrating aspects of a known motion compensated temporal filtering technique.

If the motion compensation was based on a single reference frame, that particular frame will temporally filtered as in Woods (an article entitled "Motion-Compensated 3-D Subband Coding of Video", IEEE Transactions On Image Processing, Volume 8, No. 2, February 1999, by Seung-Jong Choi and John Woods). As can be seen from FIG. 1, Woods takes two frames and transforms these frames into two frames including a high (H) frequency frame and a low (L) frequency frame. Referring back to FIG. 2, the temporal filtering unit 8 produces a L-frame by taking the average between corresponding regions in the two frames and then dividing the average by some scaling factor. Further, the temporal filtering unit produces an H-frame by taking the difference between corresponding regions in the two frames and then dividing the difference by some scaling factor. Examples of a suitable scaling factor would be the square root of two ($\sqrt{2}$) or the inverse of the square root of two ($1/\sqrt{2}$).

If the motion compensation was based on multiple reference frames, the temporal filtering unit 8 produces one H-frame for each frame being processed. As previously described, a number of frames (A-frames) in each GOP may not be processed. Thus, the temporal filtering unit 8 will not perform any filtering on such frames and just pass these frames along unchanged. Further, the frames selected as H-frames are temporally filtered by taking the difference between the regions of each frame and the similar regions found in other frames of the GOP.

As previously described, the regions in each frame being processed were matched to similar regions in other frames in the same GOP. After retrieving the similar regions, the temporal filtering unit 8 will then calculate the difference between the pixel values in the similar regions and the pixel values in the regions of the frame being processed. Further, the temporal filtering unit 8 preferably would divide this difference by some scaling factor in order to produce a H-frame.

According to the present invention, this MCTF scheme leads to an improved coding efficiency since the quality of best matches is significantly improved and the number of unconnected pixels is also reduced. In particular, simulations have shown that the number of unconnected pixels is reduced from thirty-four (34) percent to twenty-two (22) percent for each frame. However, this scheme still produces some unconnected pixels. Therefore, the Temporal filtering unit 8 will handle these unconnected pixels, as described in Woods.

As can be seen, a spatial decomposition unit 10 is included to reduce the spatial redundancies in the frames provided by the MCTF unit 4. During operation, the frames received from the MCTF unit 4 are transformed into wavelet coefficients according to a 2D wavelet transform. There are many different types of filters and implementations of the wavelet transform.

Figure 3:
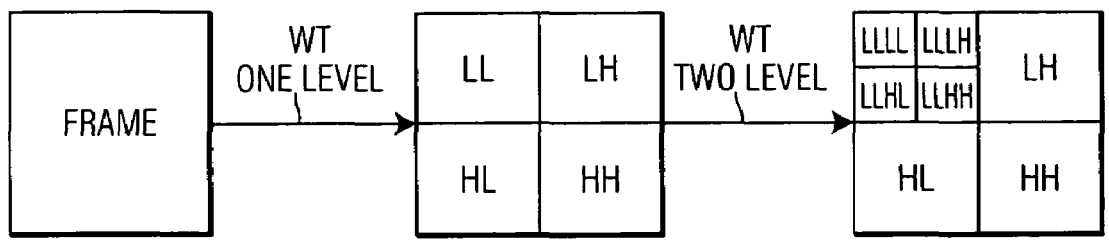
FIG. 3 a block diagram illustrating one example of a 2D wavelet transform.

One example of a suitable 2D wavelet transform is shown in FIG. 3. As can be seen, a frame is decomposed, using wavelet filters into low frequency and high frequency sub-bands. Since this is a 2-D transform there are three high frequency sub-bands (horizontal, vertical and diagonal). The low frequency sub-band is labeled the LL sub-band (low in both horizontal and vertical frequencies). These high frequency sub-bands are labeled LH, HL and HH, corresponding to horizontal high frequency, vertical high frequency and both horizontal and vertical high frequency. The low frequency sub-bands may be further decomposed recursively. In FIG. 3, WT stands for Wavelet transform. There are other well known wavelet transform schemes described in a book entitled "A Wavelet Tour of Signal Processing", by Stephane Mallat, Academic Press, 1997.

Referring back to FIG. 2, the encoder may also include a significance encoding unit 12 to encode the output of the spatial decomposition unit 10 according to significance information. In this example, significance may mean magnitude of the wavelet coefficient, where larger coefficients are more significant than smaller coefficients. In this example, the significance encoding unit 10 will look at the wavelet coefficients received from the spatial decomposition unit 10 and then reorder the wavelet coefficients according to magnitude. Thus, the wavelet coefficients having the largest magnitude will be sent first. One example of significance encoding is Set Partitioning in Hierarchical Trees (SPIHT). This is described in the article entitled "A New Fast and Efficient Image Codec Based on Set Partitioning in Hierarchical Tress," by A. Said and W. Pearlman, IEEE Transactions on Circuits and Systems for Video Technology, vol. 6, June 1996.

As can be seen from FIG. 2, dotted lines are included to indicate dependency between some of the operations. In one instance, the motion estimation 6 is dependent on the nature of the significance encoding 12. For example, the motion vectors produced by the motion estimation may be used to determine which of the wavelet coefficients are more significant. In another instance, the spatial decomposition 10 may also be dependent on the type of the significance encoding 12. For instance the number of levels of the wavelet decomposition may be related to the number of significant coefficients.

As can be further seen, an entropy encoding unit 14 is included to produce the output bit-stream. During operation, an entropy coding technique is applied to encode the wavelet coefficients into an output bit-stream. The entropy encoding technique is also applied to the motion vectors and frame numbers provided by the motion estimation unit 6. This information is included in the output bit-stream in order to enable decoding. Examples of a suitable entropy encoding technique include variable length encoding and arithmetic encoding.

Figure 4:
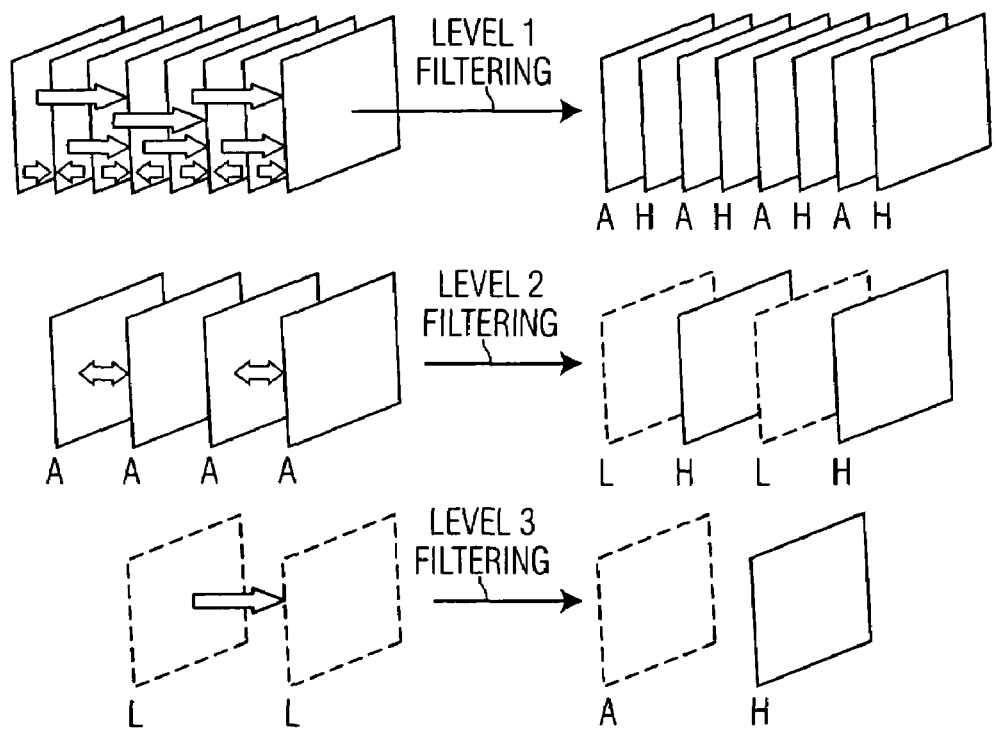
FIG. 4 is a diagram illustrating one example of temporal filtering according to the present invention.

One example of the temporal filtering according to the present invention is shown in FIG. 4. In this example, a temporal pyramidal decomposition scheme is used where a mixture of A and L-frames may be placed at different levels. As can be seen, the pyramidal decomposition in this example is implemented in three levels.

In Level 1, multiple reference frames and bi-directional prediction is used. As can be seen from Level 1, the first frame is an A-frame since there are no previous frames in the GOP to perform backward prediction with. Thus, this frame is not filtered and is left unchanged. Every other frame in this GOP was also selected as an A-frame. As previously described, a number of frames in the GOP are selected as A-frames in order to provide temporal scalability. Further, the frames not selected as an A-frame are processed as H-frames. In this example, the H-frames are produced by bi-directional prediction and temporal filtering based on multiple reference frames, as previously described. This produces the frames as shown in Level 1.

In Level 2, the A-frames from Level 1 are collected and then temporally filtered using a single reference frame, as previously described. Thus, each pair of A-frames from Level 1 is transformed into a L-frame and H-frame, as shown. Due to this scheme, the frames from Level 1 and 2 will be interleaved within the group of frames being processed.

In Level 3, the L-frames from Level 2 are temporally filtered using the multiple reference frame technique. In this example, there are only two L-frames in Level 2. Thus, either the first or last frame may only serve as a reference frame. Thus, in this example, a single reference frame is only being used. However, in other examples where there are more then two L-frames available in Level 2, multiple reference frames would be used. In this example, the first L-frame in Level 2 is selected as an A-frame and thus is not filtered. Further, the second L-frame from Level 2 is transformed into a single H-frame. This is accomplished by performing backward prediction using the first L-frame as a reference frame and then taking the scaled difference between corresponding areas in the two frames.

It should be noted that the scheme of FIG. 4 is just one example. In other examples, more frames may be included in the GOP. In Level 1, backward or forward prediction may be used instead of bi-directional prediction, as shown. In Level 3, forward or bi-directional prediction may be used instead of backward prediction, as shown. For example, if forward prediction was used in Level 3, the second L-frame would be selected as an A-frame and the first L-frame would be transformed into a H-frame. Further, the levels in FIG. 4 may be changed. For example, temporal filtering based on single reference frames may be performed in Level 1, while temporal filtering based on multiple reference frames may be performed in Level 2.

Figure 5:
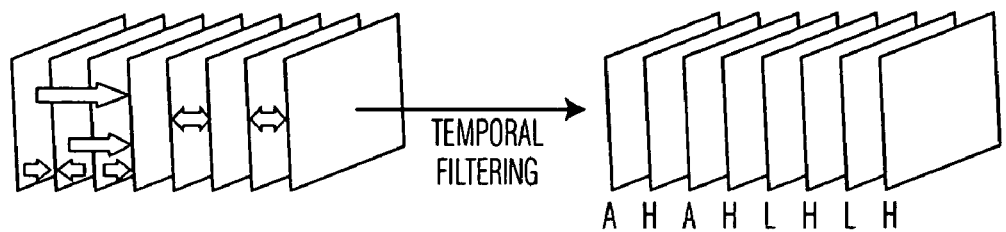
FIG. 5 is a diagram illustrating another example of temporal filtering according to the present invention.

Another example of the temporal filtering according to the present invention is shown in FIG. 5. As can be seen, a portion of the GOP is selected to be temporally filtered using multiple reference frames, while the other portion is filtered using a single reference frame. As previously described, this selection may be a predetermined or performed adaptively. In this example, the first half of the GOP is selected to be temporally filtered using multiple reference frames. Further, in this example, every other frame in the first half is selected as an A-frame. Thus, the other frames in the first half of the GOP are transformed into H-frames using bi-directional prediction. It should be noted that backward or forward prediction may be used instead. In this example, the second half of the GOP is temporally filtered using a single reference frame. Therefore, each of the two pairs of frames is transformed into a L and H-frame, as shown.

It is also should be noted that in the Example of FIG. 5, there is no constraint on the number of frames that may be selected as an A-frame. Further, the number of L-frames may also be increased by selecting a larger portion of the GOP to be filtered using a single reference frame. Also, since the A-frames are not filtered in this example, these frames will have larger magnitudes than the L-frames. Therefore, it may be preferable also to also divide the A-frames by a scaling factor to compensate for this difference. This would enable the A-frames to be grouped together with the L-frames to be filtered together as part of a pyramidal scheme.

Figure 6:
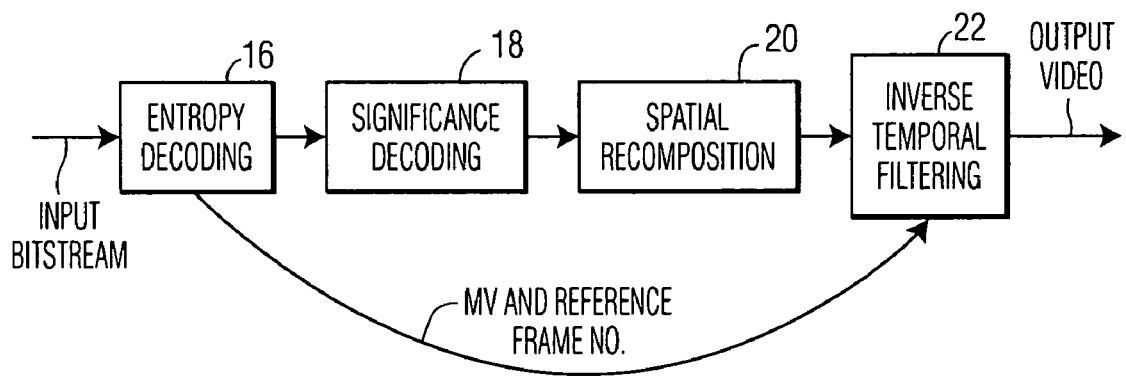
FIG. 6 is one example of a decoder according to the present invention.

One example of a decoder according to the present invention is shown in FIG. 6. As previously described in regard to FIG. 2, the input video is divided into GOPs and each GOP is encoded as a unit. Thus, the input bit-stream may include one or more GOPs that will also be decoded as a unit. The bitstream will also include a number of motion vectors MV and frame numbers that correspond to each frame in the GOP that was previously motion compensated temporally filtered. The motion vectors and frame numbers will indicate regions in other frames in the same GOPs that were previously matched to regions in each of the frames that have been temporally filtered.

As can be seen, the decoder includes an entropy decoding unit 16 for decoding the incoming bitstream. During operation, the input bit-stream will be decoded according to the inverse of the entropy coding technique performed on the encoding side. This entropy decoding will produce wavelet coefficients that correspond to each GOP. Further, the entropy decoding produces a number of motion vectors and frame numbers that will be utilized later. A significance decoding unit 18 is included in order to decode the wavelet coefficients from the entropy decoding unit 16 according to significance information. Therefore, during operation, the wavelet coefficients will be ordered according to the correct spatial order by using the inverse of the technique used on the encoder side.

As can be further seen, a spatial recomposition unit 20 is included to transform the wavelet coefficients from the significance decoding unit 18 into partially decoded frames. During operation, the wavelet coefficients corresponding to each GOP will be transformed according to the inverse of the 2D wavelet transform performed on the encoder side. This will produce partially decoded frames that have been motion compensated temporally filtered according to the present invention. As previously described, the motion compensated temporal filtering according to the present invention uses both single reference frames and multiple reference frames in the same GOP. Therefore, each GOP will include a mixture of A, H and L-frames.

An inverse temporal filtering unit 22 is included to reconstruct the partially decoded frames from the spatial recomposition unit 20 by performing the inverse of the temporal filtering performed on the encoder side. If a temporal pyramidal decomposition scheme was used, the inverse temporal filtering is preferably performed level by level starting with the highest level going down to Level 1. For instance, in the example of FIG. 4, the frames from Level 3 are first temporally filtered followed by the frames of Level 2 and Level 1, respectively. Further, the inverse temporal filtering unit 22 will apply a different method to a particular frame depending on whether the temporal filtering on the encoder side was based on either single reference frames or multiple reference frames.

If the temporal filtering was based on single reference frames, the inverse temporal filtering unit 22 processes each pair of H and L-frames included in each GOP, as follows. First, each pair of H and L-frames are multiplied by the same scaling factor as used on the encoder side. A sum and difference is then calculated for each pair of H and L-frames. Each sum and difference is then divided by another scaling factor in order to provide the reconstructed frames that corresponds to each pair of H and L-frames includes in a particular GOP. An example of a suitable scaling factor would be a value of two (2).

If the temporal filtering was based on multiple reference frames, the inverse temporal filtering unit 22 processes the H-frames included in each GOP, as follows. First, if the H-frames on the encoder side were divided by some scaling factor, these frames will be multiplied by the same factor. The H-frames in each GOP will be reconstructed based on the motion vectors MV and frame numbers provided by the entropy decoding unit 16. In order to reconstruct the H-frames, it will be first determined what kind of motion compensation was performed on the encoder side.

If on the encoding side backward motion estimation was used, the H-frame after the first A-frame in the GOP would preferably be reconstructed first. In particular, this H-frame is reconstructed by retrieving the pixel values according the motion vectors and frame numbers provided for that particular frame. In this example, the motion vectors will point to regions within the first A-frame. The inverse temporal filtering unit 22 will then add the retrieved pixel values to corresponding regions in the H-frame being reconstructed and therefore convert the difference into actual pixel values. The rest of the H-frames in the GOP will be similarly reconstructed except that pixel values from more than one previous frame may be retrieved and added to the corresponding regions in the frame being reconstructed.

If on the encoder side forward motion estimation was used, the H-frame before the last A-frame frame in the GOP would preferably be reconstructed first. In particular, this H-frame is reconstructed by retrieving the pixel values according the motion vectors and frame numbers provided for that particular frame. In this example, the motion vectors will point to regions within the last A-frame. The inverse temporal filtering unit 22 will then add the retrieved pixel values to corresponding regions in the current H-frame being reconstructed and therefore convert the difference into an actual pixel value. The rest of the H-frames in the GOP will be similarly reconstructed except that pixel values from more than one proceeding frame may be retrieved and added to the corresponding regions in the frame being reconstructed.

If on the encoder side bi-directional motion estimation was used, either the H-frame after the first A-frame or before the last A-frame in the GOP would be preferably reconstructed first depending on which example was implemented. In particular, this H-frame is reconstructed by retrieving the pixel values according the motion vectors and frame numbers provided for that particular frame. In this case, the motion vectors will point to regions within the either first or last A-frame.

As previously described, the bi-directional H-frames may include regions that were filtered based on matches from previous frames, proceeding frames or both. For the matches from just the previous or proceeding frames, the pixel values will be just retrieved and added to the corresponding region in the current frame being processed. For the matches from both, the values from both the previous and proceeding frame will be retrieved and then averaged. This average will then be added to the corresponding region in the current frame being processed. The rest of the H-frames in the GOP will be similarly reconstructed except that pixel values from more than one previous or proceeding frame may be retrieved and added to the corresponding regions in the frame being reconstructed.

Figure 7:
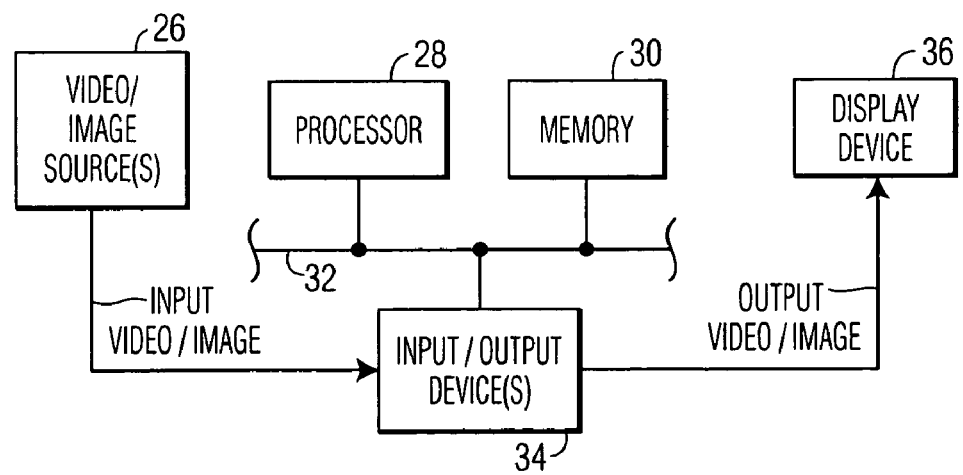
FIG. 7 is one example of a system according to the present invention.

One example of a system in which the wavelet based coding utilizing motion compensated temporal filtering based on both single and multiple reference frames according to the present invention may be implemented is shown in FIG. 7. By way of example, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system includes one or more video sources 26, one or more input/output devices 34, a processor 28, a memory 30 and a display device 36.

The video/image source(s) 26 may represent, e.g., a television receiver, a VCR or other video/image storage device. The source(s) 26 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 34, processor 28 and memory 30 communicate over a communication medium 32. The communication medium 32 may represent, e.g., a bus, a communication network, one or more internal connections of a circuit, circuit card or other device, as well as portions and combinations of these and other communication media. Input video data from the source(s) 26 is processed in accordance with one or more software programs stored in memory 30 and executed by processor 28 in order to generate output video/images supplied to the display device 36.

In particular, the software programs stored on memory 30 includes the wavelet based coding utilizing motion compensated temporal filtering based on both single and multiple reference frames, as described previously in regard to FIGS. 2 and 6. In this embodiment, the wavelet based coding utilizing motion compensated temporal filtering based both single and multiple reference frames is implemented by computer readable code executed by the system. The code may be stored in the memory 30 or read/downloaded from a memory medium such as a CD-ROM or floppy disk. In other embodiments, hardware circuitry may be used in place of, or in combination with, software instructions to implement the invention.

While the present invention has been described above in terms of specific examples, it is to be understood that the invention is not intended to be confined or limited to the examples disclosed herein. Therefore, the present invention is intended to cover various structures and modifications thereof included within the spirit and scope of the appended claims.

What is claimed is:

1. A method of decoding a bit-stream including a group of encoded video frames, comprising the steps of:
    entropy decoding the bit-stream to produce wavelet coefficients;
    transforming the wavelet coefficients into a group of partially decoded frames, and
    inverse temporal filtering a first number of partially decoded frames retrieving regions from multiple reference frames previously matched to regions in each of the first number of partially decoded frames and adding pixel values of the regions in the multiple reference frames to pixel values of the regions in first number of partially decoded frames; and
    inverse temporal filtering a second number of partially decoded frames using single reference frames.

2. The method of claim 1, wherein retrieving regions from multiple reference frames is performed according to motion vectors and frame numbers included in the bit-stream.

3. The method of claim 1, which further includes multiplying the first number of partially decoded frames by a scaling factor.

4. The method of claim 1, which further includes decoding the wavelet coefficients according to significance information.

5. The method of claim 1, wherein the first number of partially decoded frames are located within a first portion of the group and the second number of partially decoded frames are located within a second portion of the group.

6. The method of claim 1, wherein the first number of partially decoded frames and the second number of partially decoded frames are interleaved within the group.

7. A method of decoding a bit-stream including a group of encoded video frames, comprising the steps of:
    entropy decoding the bit-stream to produce wavelet coefficients;
    transforming the wavelet coefficients into a group of partially decoded frames; and
    inverse temporal filtering a first number of partially decoded frames using multiple reference frames; and
    inverse temporal filtering a second number of partially decoded frames by calculating a difference between a first half and a second half of the second number of partially decoded frames and calculating a sum of a first half and a second half of the second number of partially decoded frames.

8. The method of claim 7, which further includes dividing the difference and the sum by a scaling factor.

9. A device for decoding a bit-stream including a group of encoded video frames, comprising:
    an entropy decoding unit for decoding the bit-stream into wavelet coefficients;
    a spatial recomposition unit for transforming the wavelet coefficients into partially decoded frames; and
    an inverse temporal filtering unit for processing a first number of partially decoded frames using multiple reference frames and for processing a second number of partially decoded frames using single reference frames, wherein the first number of partially decoded frames are processed by retrieving regions from the multiple reference frames previously matched to regions in each of the first number of partially decoded frames and adding pixel values of the regions in the multiple reference frames to pixel values of the regions in first number of partially decoded frames.

10. A memory medium including code for decoding a bit-stream including a group of encoded video frames, the code comprising:
- a code for entropy decoding the bit-stream to produce wavelet coefficients;
- a code for transforming the wavelet coefficients into partially decoded frames; and
- a code for inverse temporal filtering a first number of partially decoded frames retrieving regions from multiple reference frames previously matched to regions in each of the first number of partially decoded frames and adding pixel values of the regions in the multiple reference frames to pixel values of the regions in first number of partially decoded frames; and
- a code for inverse temporal filtering a second number of partially decoded frames using single reference frames.

* * * * *